United States Patent
Ohwaki et al.

(10) Patent No.: US 7,128,654 B2
(45) Date of Patent: Oct. 31, 2006

(54) CONSTANT VELOCITY JOINT

(75) Inventors: Tomonori Ohwaki, Kariya (JP);
Tomoo Suzuki, Chita-gun (JP);
Kazuyuki Ichikawa, Okazaki (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/513,789

(22) PCT Filed: Jun. 5, 2003

(86) PCT No.: PCT/JP03/07105

§ 371 (c)(1),
(2), (4) Date: Nov. 17, 2004

(87) PCT Pub. No.: WO03/104669

PCT Pub. Date: Dec. 18, 2003

(65) Prior Publication Data

US 2005/0202881 A1  Sep. 15, 2005

(30) Foreign Application Priority Data

Jun. 6, 2002 (JP) .............................. 2002-165916

(51) Int. Cl.
*F16D 3/48* (2006.01)
(52) U.S. Cl. ..................... 464/145; 464/906; 464/140; 464/146
(58) Field of Classification Search ................ 464/145, 464/906, 140, 146
See application file for complete search history.

(56) References Cited

U.S. PATENT DOCUMENTS

| 4,968,287 A | 11/1990 | Jacob |
| 5,221,233 A | 6/1993 | Jacob |

FOREIGN PATENT DOCUMENTS

| DE | 44 43 093 C1 | 1/1996 | |
|---|---|---|---|
| JP | 55-126124 | * 9/1980 | ................. 464/145 |
| JP | 58-214019 | 12/1983 | |
| JP | 60-167816 | 11/1985 | |
| JP | 60-167817 | 11/1985 | |
| JP | 3-84423 | 8/1991 | |
| WO | 01/16500 | 3/2001 | |

* cited by examiner

*Primary Examiner*—Aaron Dunwoody
(74) *Attorney, Agent, or Firm*—Oblon, Spivak, McClelland, Maier & Neustadt, P.C.

(57) ABSTRACT

The contact angle of the ball 15 with each first guide track 21 of an inner joint member 12 is made to become smaller gradually from an opening portion side toward a bottom portion side, and the curvature radius for the first guide track 21 is made to become larger gradually from the opening portion side toward the bottom portion side. If the contact angle only were made to become smaller gradually from the opening portion side toward the bottom portion side, the contact angle would become too small thereby to cause chattering in rotation to be generated. If the curvature radius only were made to become larger gradually from the opening portion side toward the bottom portion side, a contact ellipse M2 defined by the ball 15 and the first guide track 21 would become tool small, which would cause the ball 15 to make dents on the surface of the first guide track 21. However, the aforementioned drawbacks can be obviated by gradually diminishing the contact angle and gradually enlarging the curvature radius from the opening portion side toward the bottom portion side.

4 Claims, 3 Drawing Sheets

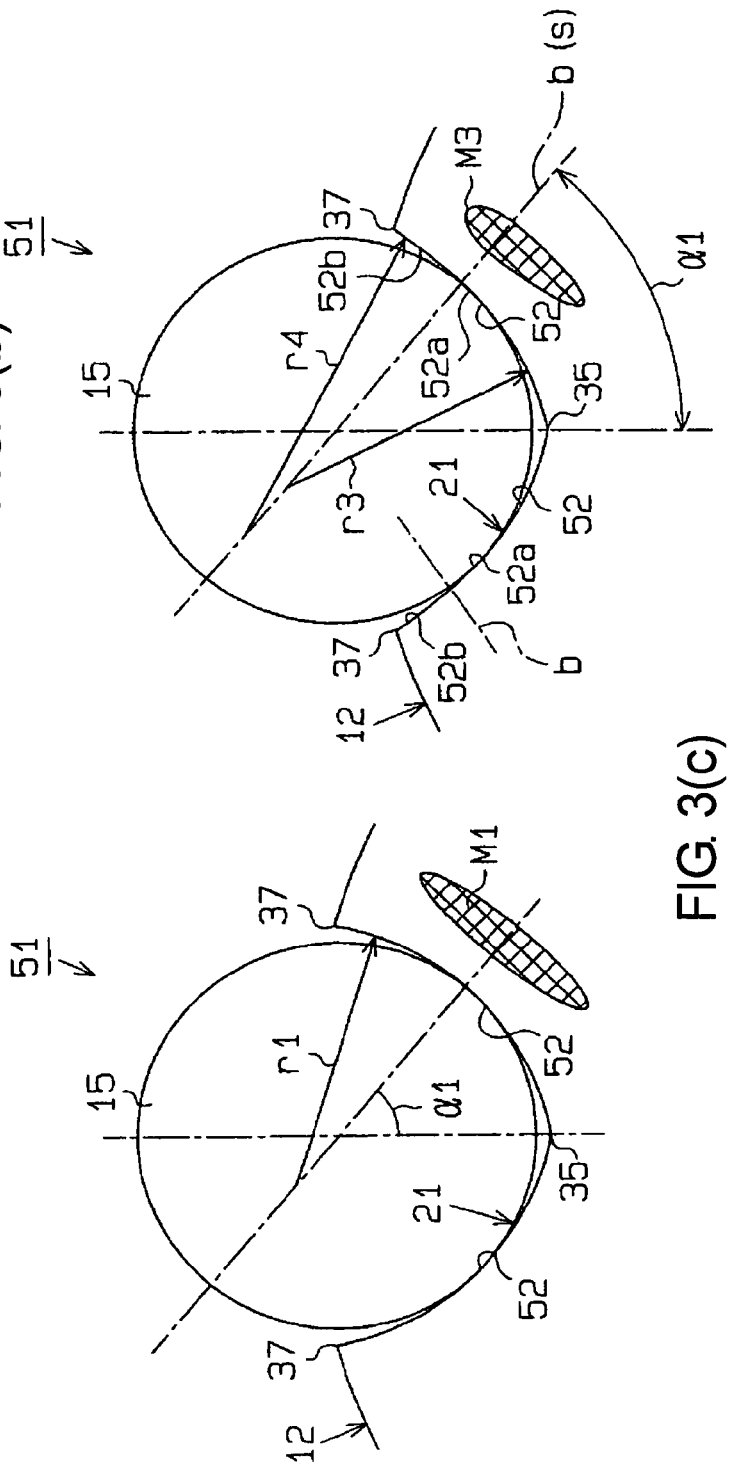
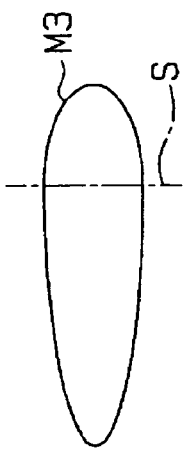

CONSTANT VELOCITY JOINT

TECHNOLOGICAL FILED:

The present invention relates to a constant velocity joint.

BACKGROUND ART

Heretofore, there have been known constant velocity joints of the ball joint type wherein the angle (joint angle) between two axes intersecting with each other is variable and wherein the constant or equality of velocity in the transmission of rotational movement is maintained between the two axes. The constant velocity joint is provided with an inner joint member, an outer joint member, a cage with ball retaining windows, and balls.

The inner joint member has its external surface taking a spherical surface and provided with plural first guide tracks extending in the axial direction thereof. The outer joint member is of a cup-shape having its internal surface taking a spherical surface and provided with plural second guide tracks of the same number as those of the first guide tracks, extending in the axial direction thereof. The cage is fit between the inner and outer joint members. The balls are retained in the ball retaining windows and are engaged with the first and second guide tracks for transmitting the torque of the inner joint member to the outer joint member.

The first and second guide tracks are formed to become shallower gradually from an opening portion side toward a bottom portion side of the outer joint member. The first and second guide tracks are constituted so that each of the balls is kept in contact with the first and second guide tracks at a constant contact angle over the whole length from the opening portion side toward the bottom portion side. Further, each of the first and second guide tracks is formed to have its cross-section constituted by two curved surfaces which intersect with each other at a track bottom center, and each of the curved surfaces is defined by a radius whose curvature is constant over from the opening portion side to the bottom portion side.

The term "contact angle" used herein means the angle that a contact center of the ball with the guide truck and the track bottom center of the guide track make with respect to a reference at the center of the ball. The term "contact center" herein means the point at which a major axis and a minor axis intersect with each other on a contact surface (contact ellipse) of an elliptical shape which is formed by the contact of each ball with each guide track. The term "major axis" means the axis which constitutes the longest portion in a lengthwise direction of the contact ellipse, and the term "minor axis" means the axis which constitutes the longest portion in a direction orthogonal to the major axis.

However, in the constant velocity joint of the foregoing prior art, the first and second guide tracks are formed to become shallower gradually from the opening portion side toward the bottom portion side (i.e., from the left side (opening portion side) toward the right (bottom portion side) as shown in FIG. 1). For this reason, as shown at the lower half in FIG. 1 and as shown in FIG. 5($a$), when located at the bottom portion side of the outer joint member 113, each ball 101 occupies a deep track portion of the first guide track 102 of the inner joint member 112. Thus, the elliptical contact surface (hereafter referred to as "contact ellipse D" which is formed by the contact of the ball 101 with the first guide track 102 does not protrude from the first guide track 102.

However, the following problem arises when each ball 101 is located at the opening portion side of the outer joint member 113 as shown at the upper half in FIG. 1 and as shown in FIG. 5($b$). That is, although the contact angle is the same as the contact angle ($\beta$) at the opening portion side and the curved surface is the same as the curved surface (K) at the opening portion side, the major-axis side radius of the contact ellipse D protrudes from the edge portion 102$a$ of the first guide track 102, because the first guide track 102 of the inner joint member 112 is shallow. In this state, the ball 101 is liable to run on the edge portion 102$a$ of the first guide track 102 thereby to exert an excess load on the edge portion 102$a$. Thus, the edge portion 102$a$ is liable to chip off.

The present invention is made taking the foregoing circumstances into consideration, and it is an object thereof to provide a constant velocity joint which is capable of preventing each ball from protruding from a guide track therefor and of securing a sufficient contact area of the ball with the guide track.

DISCLOSURE OF THE INVENTION

In the first aspect, the present invention resides in a constant velocity joint provided with an inner joint member whose outer surface takes a spherical surface and has plural first guide tracks extending in the axial direction thereof; an outer joint member of a cup shape whose internal surface takes a spherical surface and has second guide tracks of the same number as the first guide tracks, extending in the axial direction thereof; a cage fit between the inner and outer joint members; and balls retained respectively in ball retaining windows of the cage and engaged with the first and second guide tracks, wherein at least one of each first guide track and each second guide track is made to be smaller in contact angle with the ball at a bottom portion side than at an opening portion side of the outer joint member and is made to be larger in curvature radius for the one guide track at the bottom portion side than at the opening portion side.

With this construction, since the contact angle at the bottom portion side is smaller than the contact angle at the opening portion side, each contact ellipse of an elliptical shape which is defined at the bottom portion side by the contact of the ball with the guide track is located closer to a track bottom center side compared with a contact ellipse defined at the opening portion side. Further, since the curvature radius for the guide track at the bottom portion side is large in comparison with the curvature radius at the opening portion side, the contact area of the ball with each curved surface of the guide track becomes smaller at the bottom portion side. As a consequence, the contact ellipse at the bottom portion side is made to be smaller in comparison with the contact ellipse at the opening portion side. Therefore, though the first or second guide track is shallow at the bottom portion side, it does not occur that each contact ellipse at the bottom portion side protrudes out of an edge portion, and thus, the ball does not protrude from the first or second guide groove even when the joint angle is enlarged, so that a sufficient contact area can be secured between the ball and the first or second guide track. This results in diminishing the surface pressure that the first or second guide track receives from the ball. Accordingly, the concentration of stresses on each edge portion can be obviated, so that the durability of the constant velocity joint can be improved.

Further, since the contact ellipse is made not to protrude from the edge portion by properly adjusting both of the contact angle and the curvature radius in forming the first or second guide track, the inner joint member according to the present invention can be enhanced in the freedom of design compared with the case where the contact angle only or the curvature radius only is adjusted in forming the first or second guide track.

Furthermore, since within the regular or usual use range (joint angle: 0 to around ±10 degrees) of the first or second guide track, the contact ellipse in the range is larger in area (contact area) than the contact ellipse at the bottom portion side, the surface pressure (i.e., stress) can be diminished, so that the same durability as in the prior art can be maintained within the usual use range. In addition, although the contact ellipse at the bottom portion side at which the joint angle takes a large angle becomes small in area thereby to heighten the surface pressure, the bottom portion side is less frequency in use than the usual use range, and stress is hardly exerted on each of the edge portions, so that the edge portions can get rid of the liability to be damaged. Accordingly, in comparison with the inner joint member in the prior art, the inner joint member according to the present invention can be made to be small in thickness with its durability being secured, so that it can be downsized to the extent that the thickness is made to be small.

In the second aspect, the present invention resides in the constant velocity joint as set forth in the first aspect, wherein the contact angle is set to become smaller gradually from the opening portion side toward the bottom portion side of the outer joint member, and wherein the curvature radius is set to become larger gradually from the opening portion side toward the bottom portion side. With this construction, it can be realized to perform and accomplish the same functions and advantages as those in the constant velocity joint defined in the first aspect.

In the third aspect, the present invention resides in a constant velocity joint provided with an inner joint member whose outer surface takes a spherical surface and has plural first guide tracks extending in the axial direction thereof; an outer joint member of a cup shape whose internal surface takes a spherical surface and has second guide tracks of the same number as the first guide tracks, extending in the axial direction thereof; a cage fit between the inner and outer joint members; and balls retained respectively in ball retaining windows of the cage and engaged with the first and second guide tracks. At least at the bottom portion side of the outer joint member, at least one of each first guide track and each second guide track is made to be smaller in the curvature radius at a track bottom side than in the curvature radius at each edge side of the same guide track.

With this construction, a contact ellipse whose edge portion side and track bottom center side are asymmetrical with respect to the minor axis is formed by the contact of the ball with each curved surface of the first guide track or the second guide track. That is, in each contact ellipse, the area extending from the minor axis toward the edge portion side becomes short in the major axis direction and small in contact area in comparison with the area extending from the minor axis toward the track bottom center. Accordingly, it can be realized to prevent the ball from protruding out of the edge portions at the shallow track area of the bottom portion side of the first guide track or the second guide track. In other words, a setting is provided for securing a predetermined distance between each edge portion and each contact ellipse. As a result, since a required contact area of the ball with the first guide track or the second guide track is secured by providing a large contact area at the area of each contact ellipse which is located at the track bottom center side from the minor axis, the surface pressure can be reduced by securing a large contact surface at the track bottom center side of the first guide track or the second guide track. Thus, the surface pressure can be reduced even when the joint angle takes a large angle, and the major axis length of each contact ellipse at the bottom portion side can be made to be shorter than that of each contact ellipse at the opening portion side, so that the damage at each of the edge portions can be suppressed.

Further, since each of the contact ellipses is formed not to protrude out of the edge portion by properly adjusting different curvature radii forming two curved surfaces, the inner joint member in the present invention can be enhanced in the freedom of design compared with the case where the first guide track or the second guide track is formed by adjusting the contact angle only or the curvature radius only.

In the fourth aspect, the present invention resides in the constant velocity joint as set forth in the third aspect, wherein over the whole length thereof, at least one of each first guide track and each second guide track is made to be smaller in the curvature radius at the track bottom side than in the curvature radius at each edge side of the same guide track. With this construction, it can be realized to perform and accomplish the same functions and advantages as those in the constant velocity joint defined in the third aspect.

In the fifth aspect, the present invention resides in the constant velocity joint as set forth in the third or fourth aspect, wherein the contact angle of the ball with the each guide track is made to be smaller at the bottom portion side than at the opening portion side of the outer joint member. With this construction, it can be realized to perform and accomplish the same functions and advantages as those in the constant velocity joint defined in the third or fourth aspect.

BRIEF DESCRIPTION OF THE DRAWINGS

FIG. 3(a) is a cross-section taken along the line A—A of the inner joint member shown in FIG. 1 in a second embodiment;

FIG. 3(b) is a cross-section taken along the line B—B of the inner joint member shown in FIG. 1 in the second embodiment;

FIG. 3(c) is an explanatory view showing a contact ellipse;

PREFERRED EMBODIMENTS TO PRACTICE THE INVENTION (First Embodiment)

Hereinafter, a first embodiment embodying the present invention will be described with reference to FIG. 1 and FIGS. 2(a) and 2(b). The left and right in FIG. 1 will be sometimes called an opening portion side and a bottom portion side, respectively.

Figure 1:
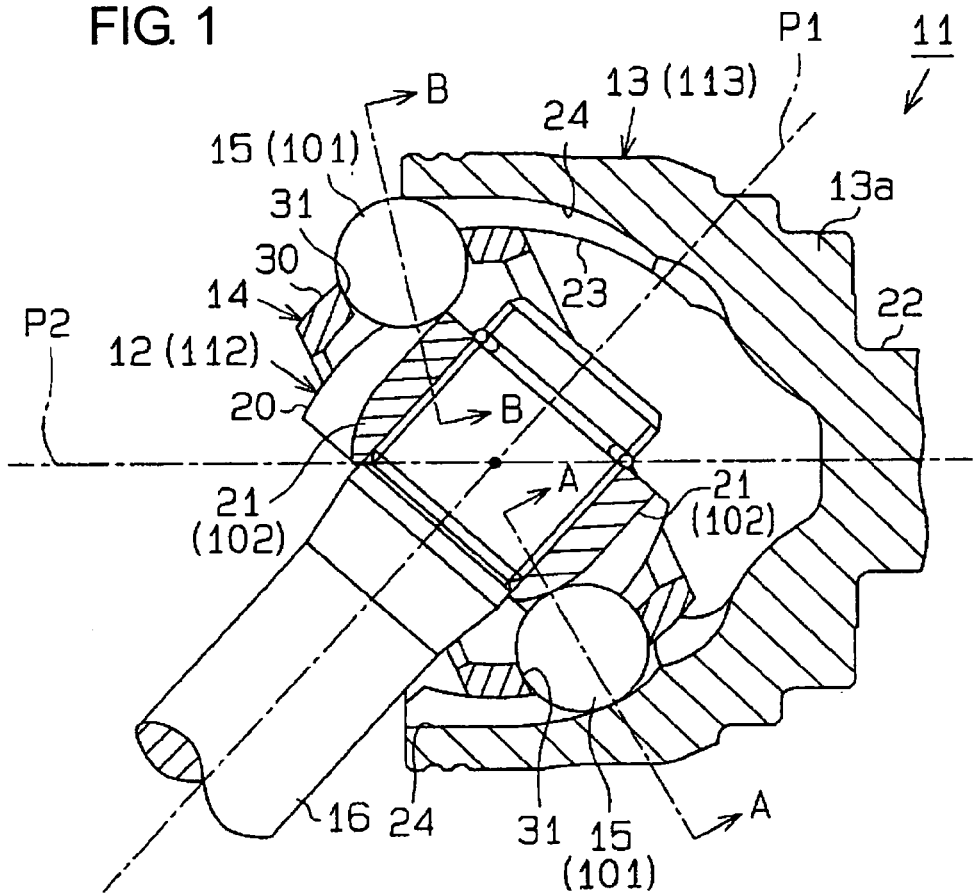
FIG. 1 is a longitudinal sectional view of a constant velocity joint in a first embodiment and in the prior art.

As shown in FIG. 1, a constant velocity joint 11 in the present embodiment is composed of an inner joint member 12, an outer joint member 13, a cage 14 fit between the both joint members 12, 13, and balls 15 retained in the cage 14.

The inner joint member 12 takes a generally cylindrical shape and is fixed on one end of a drive shaft 16 through a spline connection. An external or outer surface 20 of the inner joint member 12 is formed to be a convex spherical surface having a predetermined curvature radius. Six first guide tracks 21 respectively guiding the balls 15 in the axis P1 direction (i.e., axial direction) of the drive shaft 16 are formed on the outer surface 20 at equiangular intervals. Each first guide track 21 is formed to become shallower gradually from an opening portion side toward a bottom portion side of the outer joint member 13 in the assembled state, that is, to become shallower gradually from a body portion (i.e., left side in FIG. 1) of the drive shaft 16 toward the shaft end (i.e., right side in FIG. 1) of the same.

The outer joint member 13 takes a bottomed cup shape, and a bottom portion 13a thereof is formed to be bodily with one end of a driven shaft 22. The internal surface 23 at the opening portion side of the outer joint member 13 is formed to be a concave spherical surface having a predetermined radius at the portion corresponding to the outer surface 20 of the inner joint member 12.

And, six second guide tracks 24 are formed on the internal surface 23 for guiding the balls 15 in the axis P2 direction (i.e., axial direction) of the driven shaft 22.

As viewed in a section taken in a direction orthogonal to the axis P2, each of the second guide tracks 24 is formed by two curved surfaces which intersect with each other at a track bottom center. The two curved surfaces are formed with a predetermined curvature radius which is larger a little than the radius of the balls 15 and are constituted so that each ball 15 kept in contact with the second guide track 24 at a predetermined contact angle. Further, like the first guide tracks 21, each of the second guide track 24 is formed to become shallower gradually from the opening portion side toward the bottom portion side. The second guide tracks 24 are formed at positions respectively corresponding to the first guide tracks 21.

The cage 14 takes a generally cylindrical shape and is fit between the outer surface 20 of the inner joint member 12 and the internal surface 23 of the outer joint member 13. The outer surface 30 of the cage 14 is formed with the same radius as that for the internal surface 23 of the outer joint member 13. Six ball retaining windows 31 are formed in the cage 14 circumferentially thereof at equiangular intervals.

The balls 15 are made of steel into true sphere. The balls 15 are arranged one by one between respective pairs of the first guide tracks 21 and the corresponding second guide tracks 24 and are retained in the ball retaining windows of the cage 14.

Hereinafter, the first guide tracks 21 of the inner joint member 12 will be described in detail. FIG. 2(a) is a cross-section taken along the line A—A of the opening portion side of the first guide track 21 with the ball 15 being located at the lower side of the axis line P2 in FIG. 1, namely, of the left side of the inner joint member 12 with respect to the drive shaft 16. FIG. 2(b) is a cross-section taken along the line B—B of the bottom portion side of the first guide track 21 with the ball 15 being located at the upper side of the axis line P2 in FIG. 1, namely, of the right side of the inner joint member 12 with respect to the drive shaft 16. For the purpose of explanation, FIG. 2(a) is illustrated upside down.

Figure 2A:
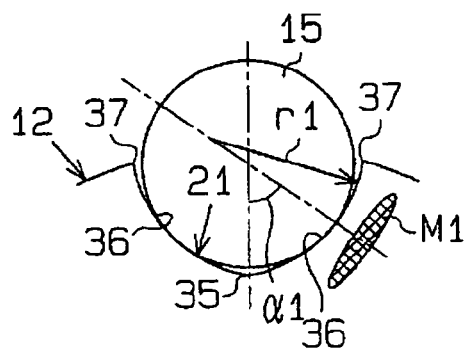
FIG. 2(a) is a cross-section taken along the line A—A of an inner joint member shown in FIG. 1 in the first embodiment.
Figure 2B:
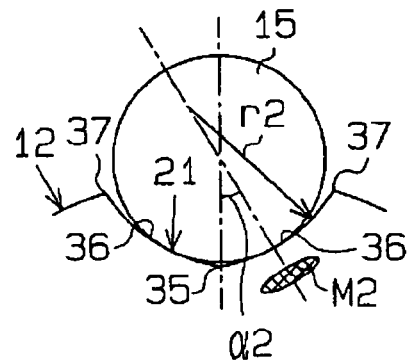
FIG. 2(b) is a cross-section taken along the line B—B of the inner joint member shown in FIG. 1 in the first embodiment.

As shown in FIGS. 2(a) and 2(b), each first guide track 21 of the inner joint member 12 is constituted by two curved surfaces 36 (at right and left as viewed in FIGS. 2(a) and 2(b)) which intersect with each other at a track bottom center 35. Each curved surface 36 is formed so that the curvature radius is gradually enlarged from the opening portion side toward the bottom portion side. That is, of the curvature radius r1 of the curved surface 36 shown in FIG. 2(a) and the curvature radius r2 of the curved surface 36 shown in FIG. 2(b), the curvature radius r2 is made to be larger. The curvature radius r1 is made to be a little larger than the radius of the balls 15.

The contact angle at which the ball 15 is in contact with the first guide track 21 is made to become smaller gradually from the opening portion side toward the bottom portion side. That is, of the contact angle α1 in FIG. 2(a) and the contact angle α2 in FIG. 2(b), the contact angle α2 is made to be smaller.

Each of the "contact angles α1 and α2" herein means the angle that the contact center of each ball 15 with the first guide track 21 and the track bottom center 35 of the first guide track 21 make with respect to a reference at the center of the ball 15. The term "contact center" herein designates a point at which a major axis and a minor axis crosses with each other on an elliptical contact surface (contact ellipse) which is formed by the contact of the first guide track 21 with the ball 15. The term "major axis" means the axis which constitutes the longest portion in a lengthwise direction of the contact ellipse, and the term "minor axis" means the axis which constitutes the longest portion in a shorter-side direction orthogonal to the major axis.

Further, the contact angles α1, α2 and the curvature radii r1, r2 are set so that contact ellipses M1, M2 each formed by the contact of the ball 15 with the curved surface 36 do not extend beyond (i.e., do not protrude from) edge portions 37 at lateral opposite ends of the first guide track 21.

Furthermore, by the foregoing setting of the large-small relationship between the curvature radii r1, r2, an area of the contact ellipse (i.e., contact area) is set to become smaller gradually from the opening portion side toward the bottom portion side.

The distance between the edge portion 37 and the contact ellipse may be even or uneven over the whole length of the first guide track 21. In a word, the distance between the edge portion 37 and the contact ellipse can take a suitable distance so far as an excess load is not exerted on the edge portion 37.

Next, description will be made regarding the operation of the constant velocity joint 11 constructed in the foregoing first embodiment.

Upon rotation of the drive shaft 16, the rotational torque of the same is transmitted from the inner joint member 12 through the balls 15 to the outer joint member 13 thereby to rotate the driven shaft 22 at the same rotational speed as the drive shaft 16. As the joint angle between the drive shaft 16 and the driven shaft 22 changes, the balls 15 are rolled to be guided on the first and second guide tracks 21, 24.

However, the balls 15 do not run on the edge portions 37 even when the joint angle is enlarged. This is for the reason why the first guide track 21 is formed so that its contact angle becomes smaller gradually from the opening portion side toward the bottom portion side and why its curvature radius becomes larger gradually from the opening portion side toward the bottom portion side.

More specifically, as shown in FIG. 2(b), because the contact angle α2 at the bottom portion side is smaller than the contact angle α1 at the opening portion side, the contact ellipse M2 of an elliptical shape which is formed by the contact of each ball 15 with each curved surfaces 36 is located closer to the track bottom center 35 compared with the contact ellipse M1 in FIG. 2(*a*). Further, because the curvature radius r2 at the bottom portion side is larger than the curvature radius r1 at the opening portion side, the contact area of each ball 15 with each curvature surface 36 is small, whereby the contact ellipse M2 is smaller in area than the contact ellipse M1.

For the reasons above, it does not occur that the contact ellipse M2 protrudes out of the edge portion 37 at the bottom portion side of the first guide track 21 although the bottom portion side is shallow in depth.

Accordingly, the following advantages can be attained according to the constant velocity joint 11 in the foregoing first embodiment.

(1) In the present embodiment, the contact angle of the ball 15 with the first guide track 21 is made to become smaller gradually from the opening portion side towards the bottom portion side, and the curvature radius of the first guide track 21 is made to be enlarged gradually from the opening portion side toward the bottom portion side.

In comparison with the case that the contact angle only or the curvature radius only is made to change gradually from the opening portion side toward the bottom portion side, the following advantages can be accomplished by making the first guide track 21 so that the contact angle becomes smaller gradually and the curvature radius becomes larger gradually from the opening portion side toward the bottom portion side.

That is, if with respect to the first guide track 21, the contact angle only were made to be diminished gradually from the opening portion side toward the bottom portion side with the curvature radius kept unchanged, the contact angle would have to be set lest that the contact ellipse each ball 15 makes with the first guide track 21 protrudes out of the edge portion 37. In this case, the contact angle would be made to be too small. This would cause the contact portions of each ball 15 with the both curvature surfaces 36 to come too close to the track bottom center 35, whereby chattering in rotation would be generated during torque transmission from the drive shaft 16 to the driven shaft 22.

On the contrary, if with respect to the first guide track 21, the curvature radius only were made to be enlarged gradually from the opening portion side toward the bottom portion side with the contact angle kept unchanged, the curvature radius would have to be set lest that the contact ellipse each ball 15 makes with the first guide track 21 protrudes out of the edge portion 37. In this case, the contact area of the contact ellipse would be made to be too small. Thus, the surface pressure the first guide track 21 receives from the ball 15 would be heightened, that is, the stress per unit area would become tool large, whereby the ball 15 would cause dents to be formed on the surface of the first guide track 21. As a result, it would be likely that the life of the constant velocity joint 11 is shortened.

However, the foregoing drawbacks can be obviated by diminishing the contact angle gradually and by enlarging the curvature radius gradually from the opening portion side toward the bottom portion side as described in the foregoing embodiment.

Accordingly, it does not occur that the ball 15 protrudes out of the first guide track 21. Further, it can be realized to sufficiently secure the contact area of the ball 15 with the first guide track 21 and to suppress the surface pressure the first guide track 21 receives from the ball 15. As a result, the stress concentration on the edge portion 37 can be precluded, so that the constant velocity joint 11 can be improved in durability.

(2) In the present embodiment, the contact ellipse is prevented from protruding out of the edge portion 37 by properly adjusting both of the contact angle and the curvature radius in designing the first guide track 21. Therefore, the inner joint member 12 in the present embodiment can be heightened in design choice compared with the case that the first guide track 21 is made by adjusting the contact angle only or the curvature radius only.

That is, if it were attempted to adjust the contact angle only, it would result that the surface pressure on the contact ellipse is determined directly thereby and that the freedom in design is lost. If it were attempted to adjust the curvature radius only, it would result that adjustment to prevent the ball 15 from protruding out of the first guide track 21 is made in dependence upon the dimension of the contact ellipse only, and this would further result in losing the freedom in designing the contact center position.

(3) In the present embodiment, as far as the ball 15 stays in a regular or usual use range (joint angle: 0 to around ±10 degrees), the contact ellipse is larger in area (contact area) than the contact ellipse M2 at the bottom portion side. Thus, it can be realized to reduce the surface pressure (i.e., stress), so that the same durability as that of the prior art can be secured in the usual use range.

Herein, the term "usual use range" means the range within which the ball 15 rolls on the first guide track 21 with the joint angle between the drive shaft 16 and the driven shaft 22 being kept within 0 to around ±10 degrees. Because the range of the joint angle corresponding to the usual use range varies in dependence on the model of the vehicle using the constant velocity joint 11, the numerical range of the 0 to around ±10 degrees is the value for illustration purpose, and the present invention is not limited to the numerical range.

The contact ellipse M2 is defined at the bottom portion side which is less frequency in use than the usual use range and which becomes larger in the joint angle. The contact ellipse M2 does not cause the edge portion 37 to suffer from stress even when decrease in the area of the contact ellipse causes the surface pressure to increase. Thus, it does not occur that the edge portion 37 is damaged.

Accordingly, compared with the inner joint member 112 in the prior art, the inner joint member 12 in the preset embodiment can secure the durability even where it is diminished in thickness, and can be made smaller to the extent that the thickness is diminished.

(Second Embodiment)

Hereinafter, a second embodiment embodying the present invention will be described with reference to FIGS. 3(*a*) to 3(*c*). A constant velocity joint 51 in the second embodiment is provided by adding a modification onto the first guide track 21 of the constant velocity joint 11 in the first embodiment. The same components as those in the first embodiment are omitted from being described in detail by having the same reference numerals put thereon. Therefore, the following description will be made to those which are different from the first embodiment.

FIG. 3(*a*) is a cross-section taken along the line A—A of the opening portion side of the first guide track 21 with the ball 15 being located at the lower side of the axis line P2 in FIG. 1, namely, of the left portion of the inner joint member 12 with respect to the drive shaft 16. FIG. 3(*b*) is a cross-section taken along the line B—B of the bottom portion side of the first guide track 21 with the ball 15 being located at the upper side of the axis line P2 in FIG. 1, namely, of the right portion of the inner joint member 12 with respect to the drive shaft 16. For the purpose of explanation, FIG. 3(a) is illustrated upside down.

The inner joint member 12 of the constant velocity joint 51 in the present embodiment is constructed so that the ball 15 is kept in contact with the first guide track 21 at a predetermined contact angle α1.

Further, at the bottom portion side thereof, the first guide track 21 is formed by two right and left (i.e., right and left in FIGS. 3(a) and 3(b)) curved surfaces 52 which intersect with each other at the track bottom center 35.

As shown in FIG. 3(b), at the bottom portion side of the first guide track 21, each curved surface 52 is constituted by two curved surface segments 52a, 52b of two different curvature radii r3, r4. On each curved surface 52 at the bottom portion side, the curved surface segment 52a with the curvature radius r3 is located at side of the track bottom center 35 (i.e., track bottom side), and the other curved surface segment 52b with the curvature radius r4 is located at the side of the edge portion 37 (i.e., edge side). The curvature radius r3 is chosen to be the same curvature radius as the curvature radius r1 in the first embodiment, and the other curvature radius r4 is chosen to be a larger curvature radius than the curvature radius r3. In this particular embodiment, the curved surface segment 52a and the curved surface segment 52b are provided to adjoin each other on a boundary line (b) shown in FIG. 3(b).

Further, the contact angle α1 and the curvature radii r3, r4 are set so that the contact ellipses M3 which are formed by the contact of the ball 15 with the curved surfaces 52 each to take an asymmetrical ellipse shape do not extend respectively beyond the edge portions 37 at both lateral sides of the first guide track 21. In addition, the minor axe S (as shown in FIG. 3(c) in an enlarged scale) of each contact ellipse M3 is set to align with the boundary line (b).

Next, the operation will be described of the constant velocity joint 51 constructed in the foregoing second embodiment.

When a large joint angle is made between the drive shaft 16 and the driven shaft 22, at least one of the balls 15 is guided along the first guide track 21 and is rolled at the bottom portion side of the first guide track 21. At the bottom portion side of the first guide track 21, as shown in FIG. 3(b), each curved surface (curved surface segment 52b) located closer to the edge portion 37 side than the minor axis (S) is formed to be larger in curvature radius than the curved surface (curved surface segment 52a) located closer to the track bottom center 35 than the minor axis (S).

For this reason, the contact ellipse M3 which is asymmetrical at each edge portion 37 side and the track bottom center 35 side is formed by the contact of the ball 15 and each curved surface 52 with a center thereof extending on the minor axis (S). That is, in each of the contact ellipses M3, the area extending from the minor axis (S) toward the edge portion 37 side becomes short in the major axis direction and small in contact area in comparison with the area extending from the minor axis (S) toward the track bottom center 35.

If the curved surface segment 52b and the curved surface segment 52a in FIG. 3(b) were of the same curvature radius, the area of each contact ellipse M3 extending from the minor axis (S) toward the edge portion 37 side would become the same in shape as the area extending from the minor axis (S) toward the track bottom center 35, and this would result in that the contact ellipse M3 protrudes out of the edge portion 37.

However, by making the curvature radius of the curved surface segment 52b larger than that of the curved surface segment 52a as described above, it can be realized to prevent the ball 15 from protruding out of the edge portion 37 at the shallow track area of the bottom portion side of the first guide track 21. In other words, a setting is provided for securing a predetermined distance between each edge portion 37 and each contact ellipse M3.

Therefore, according to the constant velocity joint 51 in the foregoing second embodiment, the following advantages can be attained in addition to the same advantage as the advantage (3) in the first embodiment.

(1) In the second embodiment, at the bottom portion side of the first guide track 21, each of the both curved surfaces 52 constituting the first guide track 21 is formed by two curved surface segments 52a, 52b of two different curvature radii r3, r4. The curved surface segment 52b larger in curvature radius than the curved surface segment 52a is formed to extend from the minor axis (S) as boundary toward the edge portion 37 side, while the curved surface segment 52a is formed to extend from the minor axis (S) as boundary toward the track bottom center 35 side.

With this construction, the area of each contact ellipse M3 located at the edge portion 37 side from the minor axis (S) is made to be shorter in length in the major axis direction than the other area of each contact ellipse M3 located at the track bottom center 35 side from the minor axis (S), and it does not occur that each contact ellipse M3 protrudes out of the edge portion 37. In addition, a required contact area is secured between the ball 15 and the first guide track 21 by providing a large contact area at the area of each contact ellipse M3 which is located at the track bottom center 35 side from the minor axis (S).

That is, the surface pressure can be reduced by securing the large contact area at the track bottom portion side of the first guide track 21. Thus, the surface pressure can be reduced even when a large joint angle is made. Moreover, the major axis length of each contact ellipse M3 at the bottom portion side can be made shorter than that of each contact ellipse M1 at the opening portion side, so that the damage at each edge portion 37 can be suppressed.

(2) In the present embodiment, each of both curved surfaces 52 at the bottom portion side of the first guide track 21 is constituted by using two different curvature radii r3, r4. Further, each contact ellipse M3 is formed not to protrude out of the edge portion 37 by properly adjusting the curvature radii r3, r4. Accordingly, the inner joint member 12 in the present embodiment can be enhanced in the freedom of design compared with the case where the first guide track 21 is formed by adjusting the contact angle only or the curvature radius only.

(Other Embodiments)

The foregoing embodiments may be embodied by being modified to the following other embodiments.

Although in the second embodiment, the inner joint member 12 is formed to align the minor axis (S) of each contact ellipse M3 with the boundary line (b), the inner joint member 12 may be formed not to make the minor axis (S) align with the boundary line (b).

In the first embodiment, the contact angle of the ball 15 with the first guide track 21 is made to be diminished gradually from the opening portion side toward the bottom portion side, and the curvature radius for the first guide track 21 is made to be enlarged gradually from the opening portion side toward the bottom portion side. Without being limited to this construction, the contact angle on the first guide track 21 may be made to take a constant angle from the opening portion side up to a track mid portion and to be diminished gradually from the track mid portion toward the bottom portion side, and the curvature radius may be made to be constant from the opening portion side up to the track mid portion and to be enlarged gradually from track mid portion toward the bottom portion side.

In the second embodiment, only at the bottom portion side of the first guide track 21, each of the curved surfaces 52 is formed by the two curved surface segments 52a, 52b of different curvature radii r3, r4. Without being limited to this construction, each of the curved surfaces 52 may be formed by the two curved surface segments 52a, 52b of different curvature radii r3, r4 over the whole length of the first guide track 21.

Figure 4:
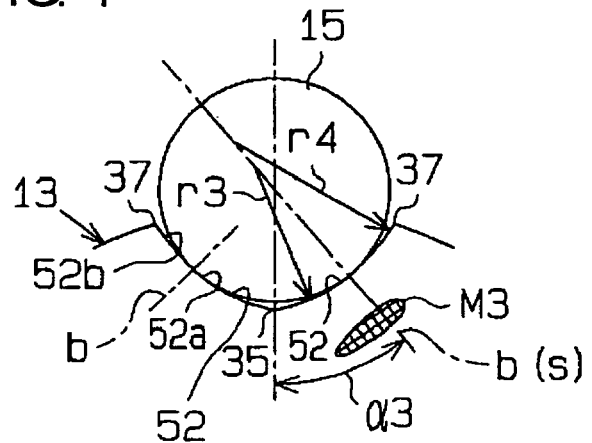
FIG. 4 is a cross-section taken along the line B—B of the inner joint member shown in FIG. 1 in a further embodiment.
Figure 5A:
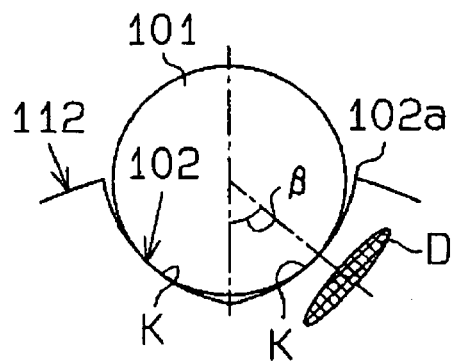
FIG. 5(a) is a fragmentary cross-section of an opening portion side of an inner joint member in a prior art.
Figure 5B:
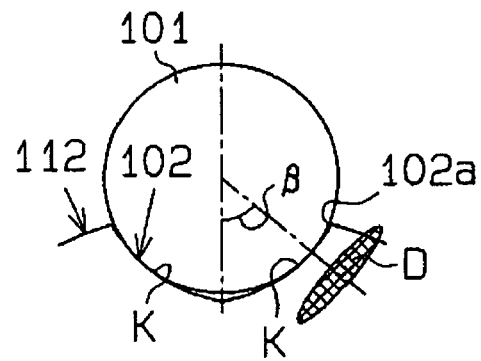
FIG. 5(b) is a fragmentary cross-section of a bottom portion side of the inner joint member in the prior art.

In the second embodiment, the first guide track 21 is formed so that the ball 15 is kept in contact with the first guide track 21 at the predetermined contact angle α1. Without being limited to this construction, the first guide track 21 may be formed so that the contact angle at which the ball 15 is kept in contact with the first guide track 21 is diminished gradually from the opening portion side toward the bottom portion side. That is, the inner joint member 12 may be constructed so that the contact angle α3 in FIG. 4 is made smaller than the contact angle α1 in FIG. 3(a).

In the first embodiment, the contact angle at which the ball 15 is kept in contact with the first guide track 21 is made to be diminished gradually from the opening portion side toward the bottom portion side, and the curvature radius for the first guide track 21 is made to be enlarged gradually from the opening portion side toward the bottom portion side. Without being limited to this construction, the constant velocity joint may be modified so that a machining for the foregoing is implemented only on the second guide track 24 or on both of the guide tracks 21, 24. Advantages which are equivalent or superior to those in the first embodiment can be attained even where such modification is made.

In the second embodiment, each of the both curved surfaces 52 of the first guide track 21 is formed by the two curved surface segments 52a, 52b of different curvature radii r3, r4. Without being limited to this construction, the constant velocity joint may be modified so that a machining for the foregoing is implemented on the second guide track 24 only or on both of the guide tracks 21, 24. Advantages which are equivalent or superior to those in the second embodiment can be attained even where such modification is made.

INDUSTRIAL APPLICABILITY

As described hereinabove, the constant velocity joint according to the present invention is useful as one which is capable of securing a sufficient contact area of the ball with the guide track without causing the ball to protrude out of the guide track. In particular, it is suitable for use in constant velocity joints of the ball joint type wherein the angle (i.e., joint angle) between two axes intersecting with each other is variable and wherein the equality of velocity in the transmission of rotational movement is maintained between the both axes.

The invention claimed is:

1. A constant velocity joint provided with an inner joint member whose outer surface takes a spherical surface and has plural first guide tracks extending in the axial direction thereof; an outer joint member of a cup shape whose internal surface takes a spherical surface and has second guide tracks of the same number as the first guide tracks, extending in the axial direction thereof; a cage fit between the inner and outer joint members; and balls retained respectively in ball retaining windows of the cage and engaged with the first and second guide tracks, characterized in that at least one of each first guide track and each second guide track is made to be smaller in contact angle with the ball at a bottom portion side than at an opening portion side of the outer joint member and is made to be larger in curvature radius for the one guide track at the bottom portion side than at the opening portion side.

2. The constant velocity joint as set forth in claim 1, characterized in that the contact angle is set to become smaller gradually from the opening portion side toward the bottom portion side of the outer joint member, and that the curvature radius is set to become larger gradually from the opening portion side toward the bottom portion side.

3. A constant velocity joint provided with an inner joint member whose outer surface takes a spherical surface and has plural first guide tracks extending in the axial direction thereof; an outer joint member of a cup shape whose internal surface takes a spherical surface and has second guide tracks of the same number as the first guide tracks, extending in the axial direction thereof; a cage fit between the inner and outer joint members; and balls retained respectively in ball retaining windows of the cage and engaged with the first and second guide tracks, wherein at least at the bottom portion side of the outer joint member, at least one of each first guide track and each second guide track is made smaller in the curvature radius at a track bottom side than in the curvature radius at each edge side of the same guide track, and the contact angle of the ball with each guide track is made to be smaller at the bottom portion side than at the opening portion side of the outer joint member.

4. The constant velocity joint as set forth in claim 3, characterized in that over the whole length thereof at least one of each first guide track and each second guide track is made smaller in the curvature radius at the track bottom side than in the curvature radius at each edge side of the same guide track.

* * * * *